(12) United States Patent
Nicoles

(10) Patent No.: US 6,170,812 B1
(45) Date of Patent: Jan. 9, 2001

(54) SLIPPER BUSHING INCORPORATING SEALING AND TORQUE-REDUCING CHARACTERISTICS

(75) Inventor: Gregory M. Nicoles, Logansport, IN (US)

(73) Assignee: BTR Antivibration Systems, Inc., Ft. Wayne, IN (US)

( * ) Notice: Under 35 U.S.C. 154(b), the term of this patent shall be extended for 0 days.

(21) Appl. No.: 08/969,802

(22) Filed: Nov. 13, 1997

(51) Int. Cl.[7] .................................................. B60G 11/22
(52) U.S. Cl. .................. 267/281; 267/141.2; 267/141.4; 267/293
(58) Field of Search ............................. 267/141.2, 141.3, 267/141.5, 141.4, 141.7, 141.1, 140.4, 293, 294, 280, 281, 282, 141; 384/222, 147, 275, 220, 296, 153, 299

(56) References Cited

U.S. PATENT DOCUMENTS

| | | |
|---|---|---|
| 3,733,668 | 5/1973 | Lange et al. . |
| 3,995,916 | 12/1976 | Lange et al. . |
| 4,092,078 | 5/1978 | Klotz et al. . |
| 4,157,227 | 6/1979 | Hahle . |
| 4,586,840 | 5/1986 | Buhl . |
| 4,634,108 | 1/1987 | Jordens . |
| 4,645,188 | 2/1987 | Jordens . |
| 4,653,734 | 3/1987 | Munch . |
| 4,671,678 | 6/1987 | Munch . |
| 4,707,149 | 11/1987 | Hahle . |
| 4,730,584 | 3/1988 | Jordens et al. . |
| 4,744,677 * | 5/1988 | Tanaka et al. .................. 267/141 |
| 4,765,770 | 8/1988 | Buhl . |
| 4,767,108 * | 8/1988 | Tanaka et al. .................. 267/141.2 |
| 4,805,884 | 2/1989 | Jordens et al. . |
| 4,809,960 * | 3/1989 | Kakimoto et al. ............... 267/141 |
| 4,883,263 | 11/1989 | Buhl . |
| 5,029,488 | 7/1991 | Buhl et al. . |
| 5,062,654 * | 11/1991 | Kakimoto et al. ............... 267/293 |
| 5,118,087 | 6/1992 | Jordens et al. . |
| 5,143,456 | 9/1992 | Jordens et al. .................. 384/275 |
| 5,181,784 | 1/1993 | Jordens et al. .................. 384/222 |
| 5,224,783 | 7/1993 | Schmidt et al. .................. 384/223 |
| 5,263,778 | 11/1993 | Jordens et al. .................. 384/140 |
| 5,286,014 * | 2/1994 | Chakko ........................... 267/293 |
| 5,340,220 | 8/1994 | Sprang et al. . |
| 5,352,044 | 10/1994 | Jordens et al. . |
| 5,363,717 | 11/1994 | Eichholz et al. . |
| 5,437,439 | 8/1995 | Brokamp et al. . |
| 5,492,415 | 2/1996 | Jordens et al. . |
| 5,516,083 | 5/1996 | Sprang et al. . |
| 5,520,465 | 5/1996 | Kammel . |
| 5,593,233 | 1/1997 | Kammel et al. .................. 384/222 |
| 5,664,650 | 9/1997 | Kammel et al. . |

\* cited by examiner

Primary Examiner—Christopher P. Schwartz
Assistant Examiner—Thomas J. Williams
(74) Attorney, Agent, or Firm—Wood, Herron & Evans, L.L.P.

(57) ABSTRACT

A slipper bushing comprises radially inner, intermediate and outer generally cylindrical members. The intermediate member includes an axial bearing surface at an end thereof. Elastomeric material is disposed between the intermediate and outer members. A generally cylindrical polymeric radial bearing sleeve is disposed between the inner and intermediate members and has a radially inner surface nonrotatably fixed relative to a radially outer surface of the inner member and a radially outer slip surface adapted to rotatably slip relative to a radially inner surface of the intermediate member. An elastomeric seal has an annular portion with opposed first and second axial bearing surfaces. The seal first axial bearing surface sealingly engages the intermediate member axial bearing surface and is nonrotatably fixed relative thereto. An annular polymeric slip ring has opposed first and second axial bearing surfaces. The slip ring first axial bearing surface is adapted to rotatably slip relative to the seal second axial bearing surface. An end cap is nonrotatably fixed relative to the inner member and the slip ring.

6 Claims, 1 Drawing Sheet

SLIPPER BUSHING INCORPORATING SEALING AND TORQUE-REDUCING CHARACTERISTICS

FIELD OF THE INVENTION

This invention relates generally to bushings, and more particularly to slipper bushings, which are used in automobile suspension systems and which provide relative rotation between inner and outer cylindrical members of the bushing by way of slippage between mating surfaces of the inner and outer members.

BACKGROUND OF THE INVENTION

As its name implies, a slipper bushing utilizes slippage between mating surfaces of the nonrotatably fixed and rotatable portions of the slipper bushing as a means to permit controlled rotational movement therebetween. Often a lubricant, which may be contained in grooves in one or the other of the mating surfaces, is utilized to lubricate those surfaces in order to decrease the break away torque, i.e. the torque required to overcome the circumferential frictional force between the mating surfaces. It is desirable, therefore, to include an end cap on each axial end of the slipper bushing, which end cap includes an annular flange portion covering the interface of the mating surfaces, in an attempt to eliminate as much as possible any contaminants, for example dirt and the like, from entering into the bushing between the slip surfaces, since such contamination would thereby contaminate the lubricant thereon and undesirably increase the break away torque. One example of such a bushing is disclosed in Chakko U.S. Pat. No. 5,139,244, assigned to the assignee of the present invention, and hereby incorporated by reference herein as if fully set forth in its entirety.

While such a slipper bushing design can prevent at least some of the contaminants, to which a bushing is subjected in its operating environment, from entering therein, improvements in slipper bushing sealing techniques are desirable. However, any such improvements must not increase the break away torque of the slipper bushing to undesirable levels.

SUMMARY OF THE INVENTION

In accordance with the present invention, a slipper bushing comprises a radially inner generally cylindrical member, a radially intermediate generally cylindrical member including an axial bearing surface at an end thereof, a radially outer generally cylindrical member and elastomeric material disposed between the intermediate and outer cylindrical members. A generally cylindrical polymeric radial bearing sleeve is disposed between the inner and intermediate cylindrical members. The radial bearing sleeve has a radially inner surface nonrotatably fixed relative to a radially outer surface of the inner member and a radially outer slip surface adapted to rotatably slip relative to a radially inner surface of the intermediate member. An elastomeric seal has an annular portion with opposed first and second axial bearing surfaces. The seal first axial bearing surface sealingly engages the intermediate member axial bearing surface and is nonrotatably fixed relative thereto. An annular polymeric slip ring has opposed first and second axial bearing surfaces. The slip ring first axial bearing surface is adapted to rotatably slip relative to the seal second axial bearing surface. An end cap is nonrotatably fixed relative to the inner member and the slip ring.

The bushing further comprises a cylindrical ring with the seal being fixed to the ring. The seal further includes a cylindrical portion having radially inner and outer surfaces. The seal cylindrical portion radially inner surface is fixed to a radially outer surface of the cylindrical ring. The intermediate member has an inner diameter, and the cylindrical ring and seal cylindrical portion are press fitted into the inner diameter of the intermediate member. The cylindrical ring is preferably fabricated of drawn steel and the seal is preferably fabricated of rubber mold bonded to the drawn steel ring.

The slip ring has an inner diameter and the inner member has an outer diameter. The slip ring inner diameter is press fitted onto the inner member outer diameter. The slip ring is preferably fabricated of nylon.

The elastomeric material is preferably fabricated of rubber mold bonded to the intermediate sleeve.

The end cap includes a cylindrical portion and the inner member has an inner diameter. The end cap cylindrical portion is press fitted into the inner member inner diameter. The end cap includes an annular portion having an axial bearing surface engaging the slip ring second axial bearing surface and is nonrotatably fixed relative thereto.

The radial bearing sleeve is preferably fabricated of nylon mold bonded to said inner member.

The present invention is likewise applicable to the design and construction of non-duplex bearings, i.e. bearings with only two (inner and outer) cylindrical members. In this aspect of the invention, a slipper bushing comprises a radially inner generally cylindrical member, a radially outer generally cylindrical member including an axial bearing surface at an end thereof and a generally cylindrical polymeric radial bearing sleeve disposed between the inner and outer cylindrical members. The radial bearing sleeve has a radially inner surface nonrotatably fixed relative to a radially outer surface of the inner member and a radially outer slip surface adapted to rotatably slip relative to a radially inner surface of the outer member. An elastomer seal has an annular portion with opposed first and second axial bearing surfaces. The seal first axial bearing surface sealingly engages the outer member axial bearing surface and is nonrotatably fixed relative thereto. An annular polymeric slip ring has opposed first and second axial bearing surfaces. The slip ring first axial bearing surface is adapted to rotatably slip relative to the seal second axial bearing surface. An end cap is nonrotatably fixed relative to the inner member and slip ring.

The invention thus provides the advantage of added security from contaminants contaminating the slipper bushing by way of an additional seal, over and above the usual end cap, yet without suffering from a substantial increase in break away torque of the slipper bushing.

These and other advantages of the present invention will become more readily apparent during the following detailed description taken in conjunction with the drawings herein, in which:

DETAILED DESCRIPTION OF THE INVENTION

Figure 1:
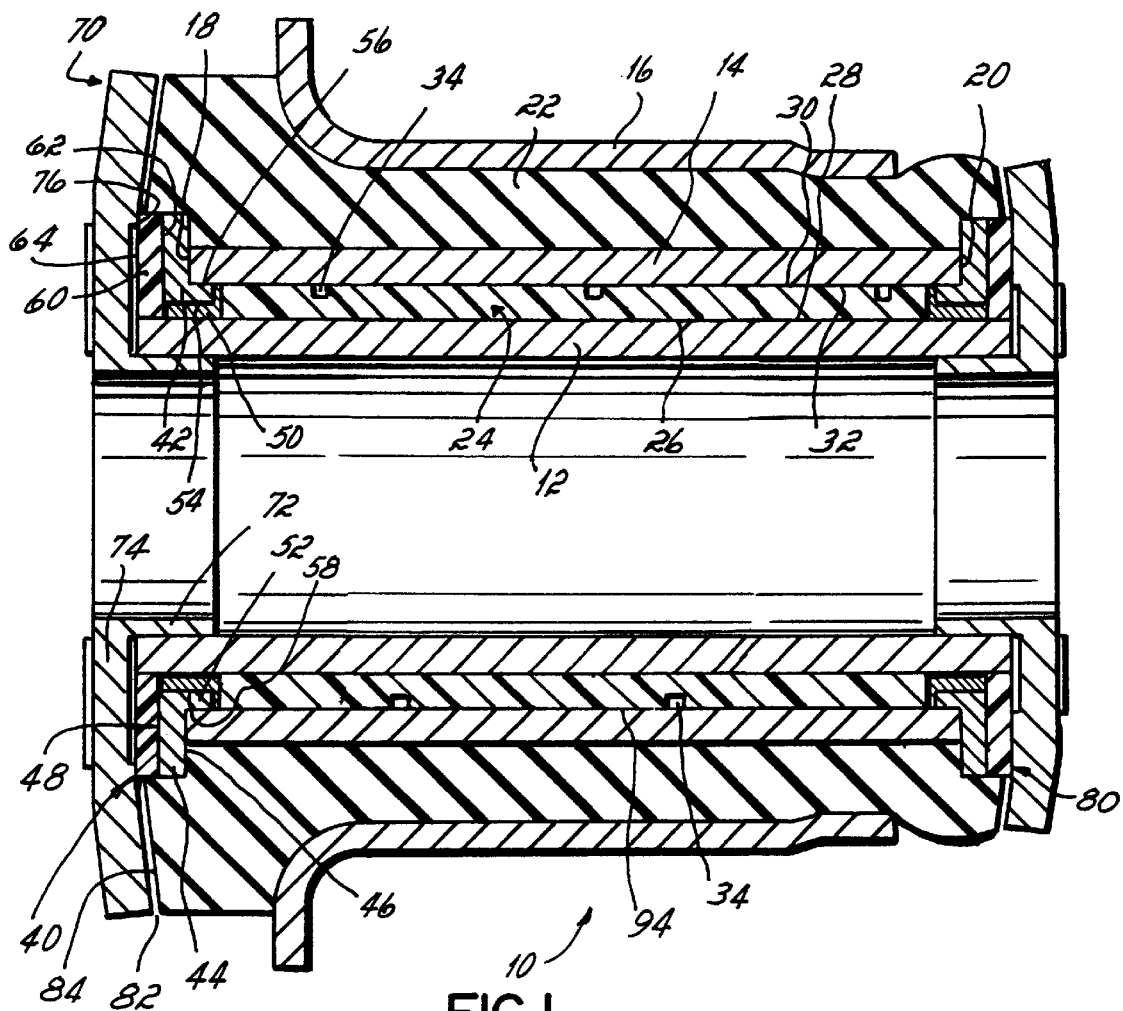
FIG. 1 is a cross-sectional view of a slipper bushing of the present invention.

Referring first to FIG. 1, there is illustrated a slipper bushing 10 according to the present invention. The bushing 10 is referred to as a "duplex" bushing; it is to be understood, however, that the present invention may be practiced with either duplex or non-duplex bushings. The slipper bushing 10 includes a radially inner generally cylindrical member 12, a radially intermediate generally cylindrical member 14 and a radially outer generally cylindrical member 16. Intermediate member 14 includes an axial bearing surface 18 at one end thereof and another axial bearing surface 20 at another end thereof. Members 12, 14 and 16 are preferably fabricated of steel. Elastomeric material 22 is disposed between the intermediate and outer members 14 and 16. Elastomeric material 22 is preferably rubber mold bonded to the intermediate member 14.

A generally cylindrical polymeric radial bearing sleeve 24 is disposed between the inner and intermediate members 12 and 14. The radial bearing sleeve 24 has a radially inner surface 26 nonrotatably fixed relative to a radially outer surface 28 of member 12. Preferably, sleeve 24 is fabricated of nylon mold bonded to the inner member 12. The sleeve 24 has a radially outer slip surface 30 which is adapted to rotatably slip relative to a radially inner surface 32 of the intermediate member 14. Slip surface 30 may include grease grooves 34 for containing an appropriate lubricant therein to reduce the break away torque of the slip surface 30 relative to the surface 32.

A seal assembly 40 includes an elastomeric seal 42 having an annular portion 44 with opposed first 46 and second 48 axial bearing surfaces. This seal first axial bearing surface 46 sealingly engages the intermediate member axial bearing surface 18 and is nonrotatably fixed relative thereto. The seal assembly 44 includes a cylindrical ring 50. The seal 42 is fixed to the ring 50. The seal 42 further includes a cylindrical portion 52 having radially inner 54 and outer 56 surfaces. The seal cylindrical portion radially inner surface 54 is fixed to a radially outer surface 58 of the cylindrical ring 50. The cylindrical ring 50 and seal cylindrical portion 52 are press fitted into the inner diameter of the intermediate member 14. The cylindrical ring 50 is preferably fabricated of drawn steel and the seal 42 is preferably fabricated of rubber mold bonded to the drawn steel ring 50.

An annular polymer slip ring 60 has opposed first 62 and second 64 axial bearing surfaces. The slip ring first axial bearing surface 62 is adapted to rotatably slip relative to the seal second axial bearing surface 48. The slip ring 60 has an inner diameter which is pressed fitted onto an outer diameter of the inner member 12.

An end cap 70 is nonrotatably fixed relative to the inner member 12 and slip ring 60. The end cap 70 includes a cylindrical portion 72 which is press fitted into an inner diameter of the inner member 12. The end cap 70 includes an annular portion 74 having an axial bearing surface 76 engaging the slip ring 60 second axial bearing surface 64 and is nonrotatably fixed relative thereto.

A like seal assembly and end cap can be placed on the other opposite end 80 of the bushing 10 if desired or required.

At 82, there is illustrated, in greatly exaggerated detail, the gap which preferably exists between the axially outer surface 84 of the elastomeric material 22 and the axially inner surface 76 (which bears against the second axial bearing surface 64 of the slip ring 70) of the annular portion 74 of the end cap 70. This gap 84 is on the order of 0.008–0.020 inches and prevents any increase in break away torque due to the elastomeric material coming into contact with the end cap.

Figure 2:
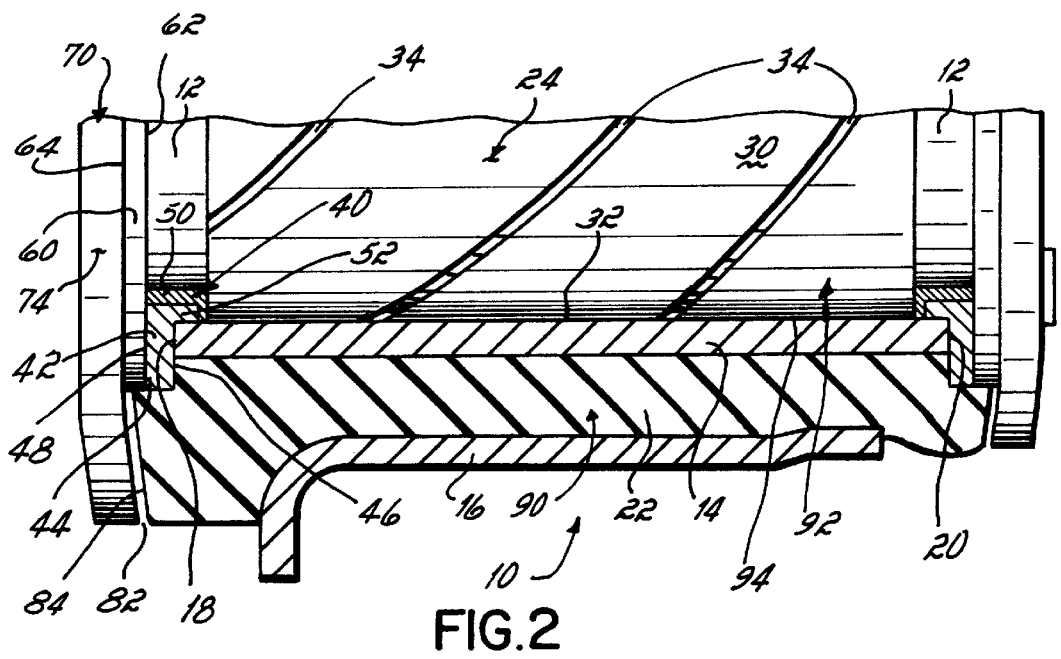
FIG. 2 is a view similar to FIG. 1, yet with the portions of the bushing which rotate relatively shown in cross-section and elevation, respectively, for clarity.

In use, and referring now to FIG. 2, the relatively rotating portions of the bushing 10 of this invention are shown in cross-section 90 and in elevation 92, respectively. Thus, the innerface 94 between these two portions of the bushing 10 comprise the mating surfaces of the bushing which slip relatively rotationally. As can be seen from this figure, the seal 42 engages the axial end 18 of the intermediate member 14 preventing contaminants from passing therebetween and reaching the interface 94 of the intermediate member 14 and bearing sleeve 24. Further, the seal 42 prevents contaminants from passing between it and the slip ring 60 again preventing contaminants from reaching the innerface 94 of the intermediate member 14 and bearing sleeve 24. However, the slip ring 60, preferably fabricated of a lubricious material such as the polymeric material nylon, prevents an unacceptable increase in break away torque between it and the seal 42 due to the nature of the material from which it is constructed. And the annular portion 74 of the end cap 70 provides further sealing of the bushing 10.

Those skilled in the art will readily recognize numerous adaptations and modifications which can be made to the present invention which will result in an improved slipper bushing incorporating sealing and torque-reducing characteristics, yet all of which will fall within the spirit and scope of the present invention as defined in the following claims. For example, the present invention may be practiced with either duplex or non-duplex type bushings. A seal assembly and end cap my be employed at either or both ends of the bushing as desired or required. And, while the mating surfaces of the bushing have been shown and described as being the bearing sleeve radially outer surface and the intermediate member radially inner surface, they could be the inner member radially outer surface and the bearing sleeve radially inner surface, i.e. the bearing sleeve could be fixed to the intermediate member rather than to the inner member. Accordingly, the invention is to be limited only by the scope of the following claims and their equivalents.

What is claimed is:

1. A slipper bushing comprising:

a radially inner generally cylindrical member;

a radially intermediate generally cylindrical member including an axial bearing surface at an end thereof;

a radially outer generally cylindrical member;

elastomeric material disposed between said intermediate and outer cylindrical members;

a generally cylindrical polymeric radial bearing sleeve disposed between said inner and intermediate cylindrical members, said radial bearing sleeve having a radially inner surface nonrotatably fixed relative to a radially outer surface of said inner member and a radially outer slip surface adapted to rotatably slip relative to a radially inner surface of said intermediate member;

an elastomeric seal having an annular portion with opposed first and second axial bearing surfaces, said seal first axial bearing surface sealingly engaging said intermediate member axial bearing surface and being nonrotatably fixed relative thereto;

an annular polymeric slip ring having opposed first and second axial bearing surfaces, said slip ring first axial bearing surface adapted to rotatably slip relative to said seal second axial bearing surface; and an end cap nonrotatably fixed relative to said inner member and slip ring;

further comprising a cylindrical ring, said seal being fixed to said cylindrical ring;

wherein said seal further includes a cylindrical portion having radially inner and outer surfaces, said seal cylindrical portion radially inner surface being fixed to a radially outer surface of said cylindrical ring.

2. The bushing of claim 1 wherein said intermediate member has an inner diameter and wherein said cylindrical ring and seal cylindrical portion are press fitted into said intermediate member inner diameter.

3. The bushing of claim 2 wherein said cylindrical ring is fabricated of drawn steel and said seal is fabricated of rubber mold bonded to said drawn steel ring.

4. A slipper bushing comprising:

a radially inner generally cylindrical member;

a radially outer generally cylindrical member including an axial bearing surface at an end thereof;

a generally cylindrical polymeric radial bearing sleeve disposed between said inner and outer cylindrical members, said radial bearing sleeve having a radially inner surface nonrotatably fixed relative to a radially outer surface of said inner member and a radially outer slip surface adapted to rotatably slip relative to a radially inner surface of said outer member;

an elastomeric seal having an annular portion with opposed first and second axial bearing surfaces, said seal first axial bearing surface sealingly engaging said outer member axial bearing surface and being nonrotatably fixed relative thereto;

an annular polymeric slip ring having opposed first and second axial bearing surfaces, said slip ring first axial bearing surface adapted to rotatably slip relative to said seal second axial bearing surface; and an end cap nonrotatably fixed relative to said inner member and slip ring;

further comprising a cylindrical ring, said seal being fixed to said cylindrical ring;

wherein said seal further includes a cylindrical portion having radially inner and outer surfaces, said seal cylindrical portion radially inner surface being fixed to a radially outer surface of said cylindrical ring.

5. The bushing of claim 4 wherein said outer member has an inner diameter and wherein said cylindrical ring and seal cylindrical portion are press fitted into said outer member inner diameter.

6. The bushing of claim 5 wherein said cylindrical ring is fabricated of drawn steel and said seal is fabricated of rubber mold bonded to said drawn steel ring.

\* \* \* \* \*